Nov. 19, 1963 J. D. SMITH 3,111,015
CIGAR LIGHTER
Filed Jan. 24, 1961 2 Sheets-Sheet 1

INVENTOR.
JAMES DONALD SMITH.
BY
Tyler S. Roundy
ATTORNEY.

Nov. 19, 1963  J. D. SMITH  3,111,015
CIGAR LIGHTER
Filed Jan. 24, 1961  2 Sheets-Sheet 2
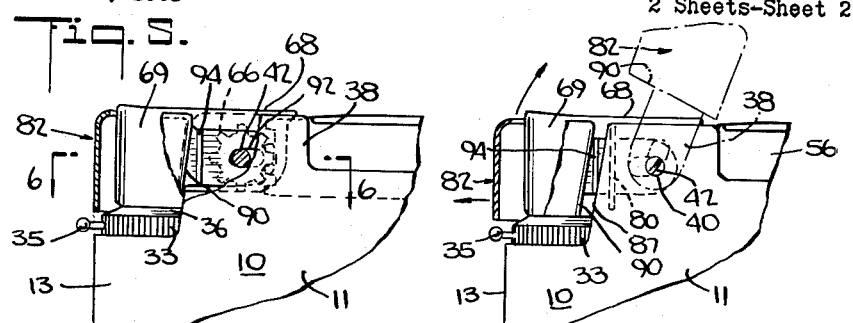
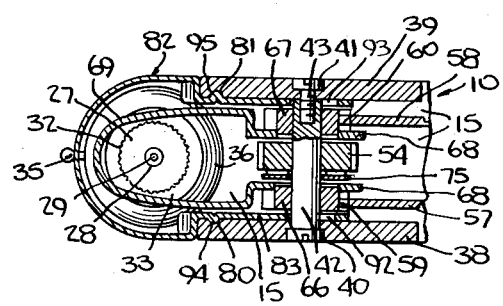
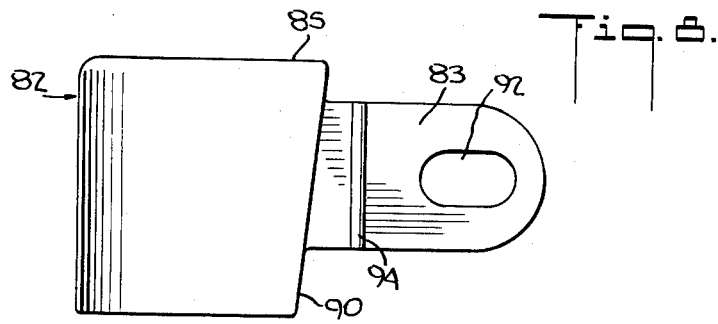
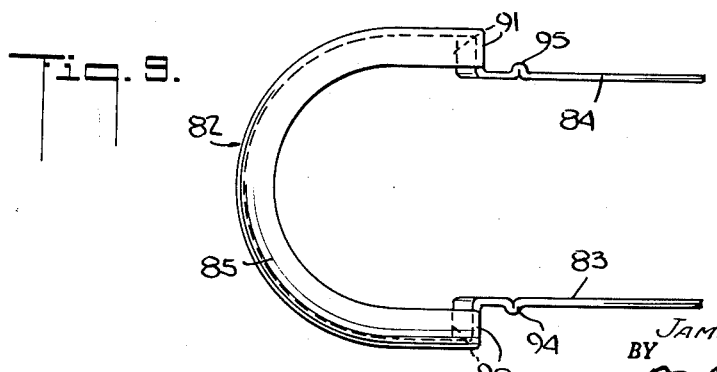
INVENTOR.
JAMES DONALD SMITH.
BY Tyler S. Roundy
ATTORNEY United States Patent Office 3,111,015
Patented Nov. 19, 1963

3,111,015
CIGAR LIGHTER
James Donald Smith, Stroudsburg, Pa., assignor to Ronson Corporation, Woodbridge, N.J., a corporation of New Jersey
Filed Jan. 24, 1961, Ser. No. 84,696
11 Claims. (Cl. 67—7.1)

This invention relates to pyrophoric lighters and particularly to those of the wind-proof type which incorporate a windshield to help maintain the flame under various conditions of use and environment.

Pyrophoric lighters are generally of the liquid-fuel type employing a wick and supplied with a liquid fuel such as naphtha or else of the liquefied gas type (so-called "gas lighter") employing a gas burner and supplied with a liquefied gas fuel such as butane. When a windshield is provided on a liquid-fuel lighter it encompasses a fuel outlet portion in the form of the upper part of a wick tube and the projecting end of the wick, whereas in a gas lighter it encompasses a fuel outlet portion in the form of the outlet portion of a gas burner.

In order to gain full access from time to time to the fuel outlet portion of lighters which carry a windshield, it is highly desirable to be able to move the windshield away from the outlet portion, and this is particularly important in gas lighters where unobstructed access to the burner valve is required in order to avoid lodging foreign matter in the burner valve, especially when cleaning such valve.

It is known to provide liquid fuel lighters with movable windshields such as those which are movable back and forth rectilinearly. However, such constructions are relatively costly to manufacture and are difficult to adjust and result in a lighter which is too bulky for convenient pocket use.

It is also known to provide liquid fuel lighters with a pivotable windshield having a pair of opposed legs which are each positioned in contact with the outer surface of respective upright supports above opposite sides of the lighter housing. The side of the free end of each windshield leg has a circular aperture of slightly greater diameter than that of the pivot pin so that each end of the pivot pin passes through the circular aperture in a respective one of the windshield legs for pivotally supporting the windshield on the pivot pin. The pivot pin in turn is horizontally supported between the pair of upright supports, and it serves as the support for the snuffer lever and sparking wheel assembly. From its normal shielding position in which it encompasses the top of the wick tube and wick, such windshield is unable to be moved backward or forward but it is capable of being immediately rotated about a single fixed axis of rotation which is at a permanent location on the windshield, which axis of rotation is on a straight line passing through the two opposed circular apertures in the legs and which axis also coincides with the fixed axis of the pivot pin, the windshield being immediately rotatable up and away from the wick tube and wick. Such immediate rotation is able to be accomplished because the pair of legs of the windshield were intentionally located on the outside of the pair of upright supports so as to face their outer surfaces. Such external mounting of the legs not only presents an unattractive appearance but also permits foreign matter to reach the pivot pin via the small moving contact space between each leg and support. Moreover, the windshield legs must be very thin in order to avoid an objectionable increase in the overall outside width of the lighter, and as a consequence such exposed legs are fragile and easily damaged when the lighter is dropped or when it is subjected to rough handling.

If the pair of legs were located inside between the inner surfaces of the upright supports, then it becomes necessary to bend the legs outwardly away from each other at intermediate points adjacent the front edges respectively of the upright supports in order that the shielding portion of the windshield will not obstruct the opening and closing of the snuffer lever and cap. Such a windshield construction is disclosed on a gas lighter in my copending U.S. patent application Serial No. 785, filed January 6, 1960, now Patent No. 3,081,611. However, in such construction there is no provision for access to the burner valve outlet, because the offset intermediate portions of the windshield legs abut against the front edges respectively of the upright supports, which prevents rotation of the windshield up and away from the burner valve outlet, and the windshield is not otherwise movable.

It is an object of the invention to provide an improved pyrophoric lighter of the windshield type.

It is another object of the invention to provide an improved lighter windshield construction.

Another object is to provide a lighter having an improved windshield arrangement wherein the windshield may be readily shifted from a non-rotatable shielding position to an intermediate position from which it may be rotated up and away from the fuel outlet portion.

A further object is to provide a lighter having a retractable windshield which is not only movable in a rectilinear manner but which is also rotatable.

It is still another object to provide a lighter having a windshield which may be lifted slightly by a finger of the user so as to cause the windshield to be automatically advanced to an intermediate forward position from which it may be swung up and away from the fuel outlet portion of the lighter.

It is another object to provide a lighter having a retractable windshield and having novel means for releasably holding or locking the windshield in its normal retracted position.

A further object is to provide a compact pocket lighter having a windshield which is capable of rotation even though its legs or free ends are located inside of the pair of upright supports for the snuffer and sparking wheel assembly.

It is a further object to provide an improved gas lighter which has a rotatable gas flame-adjusting wheel beneath the snuffer cap and encompassing the gas burner, and a windshield which is spaced sufficiently from such wheel to permit air to reach the burner and which is capable of being rotated up and away from such adjusting wheel and burner.

Various other objects, advantages and features of the present invention will become apparent from the following description taken in conjunction with the accompanying drawings which disclose a preferred form of the invention in which:

FIG. 5 is an enlarged vertical fragmentary view of the front upper portion of the lighter as shown in FIG. 2, the windshield being located in its normal retracted shielding position and being partially broken away to show the snuffer cap, the lefthand support ear also being partially broken away to show details of the windshield and operating mechanism;

FIG. 6 is an enlarged horizontal sectional view of the lighter taken along the line 6—6 of FIG. 5;

FIG. 7 is an enlarged vertical fragmentary view similar to FIG. 5 but showing the windshield in its advanced forward position from which it may be rotated up and away from the gas burner to different raised positions, the most extreme raised position being shown in dotted lines;

FIG. 8 is an enlarged side elevational view of the windshield member in accordance with the invention; and FIG. 9 is a plan view of the windshield member shown in FIG. 8.

Figures 1, 2, 3, 4:
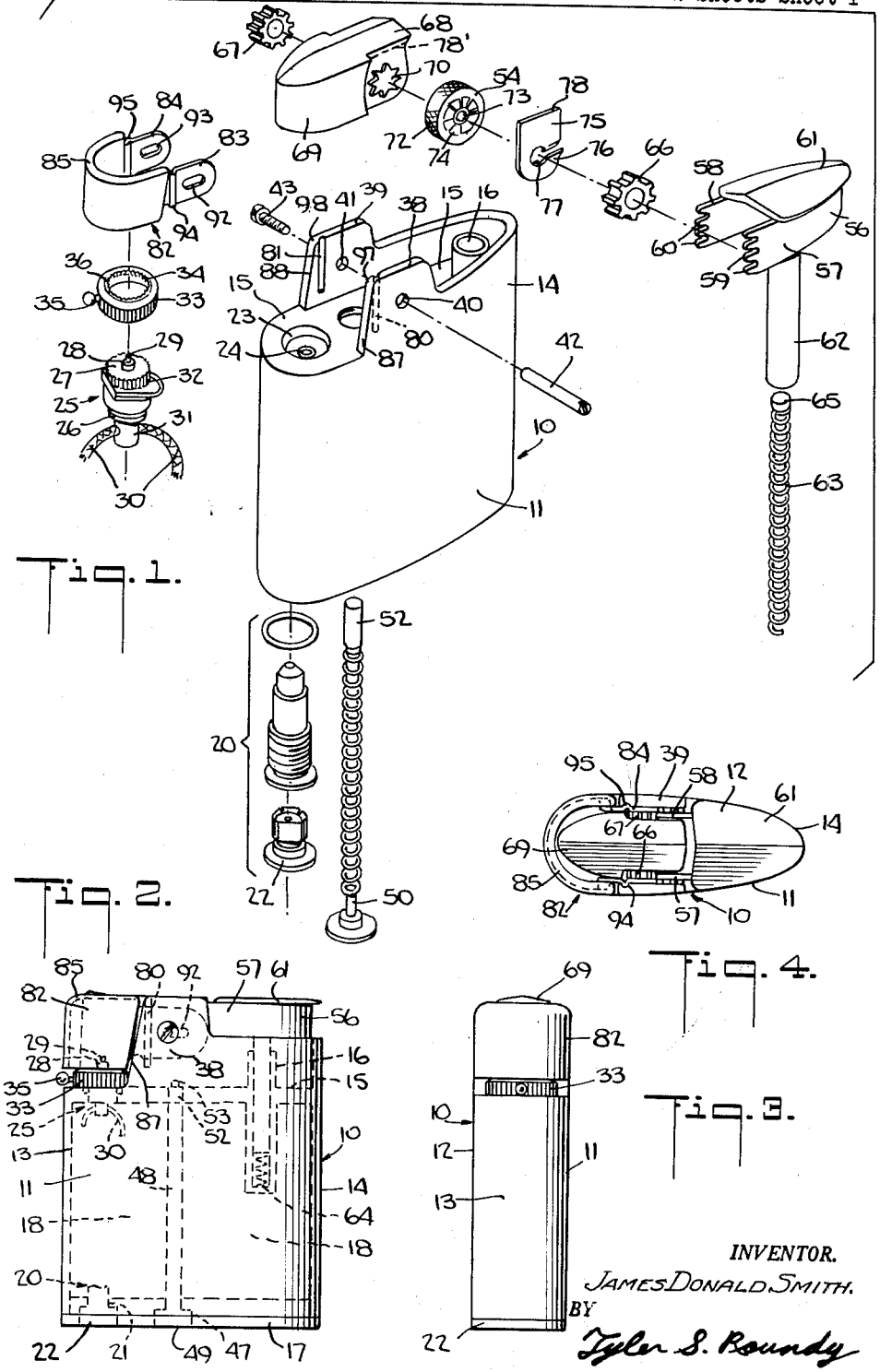
FIG. 1 is an exploded view of a lighter in accordance with the invention.
FIG. 2 is a side elevational view of the lighter of FIG. 1, with certain internal parts indicated by dotted lines.
FIG. 3 is a front view of the lighter, as viewed from the lefthand side of FIG. 2.
FIG. 4 is a plan view of the lighter.

Referring to the drawings in detail, there is shown a pyrophoric lighter housing or casing 10 of a metal such as aluminum having integral side wall portions 11 and 12, front wall 13, rear wall and a top wall portion 15. A tubular vertical guidepost 16 may also be formed integral with the top wall portion 15. The housing 10 with wall portions 11–15 and post 16 may be formed as an integral unit by a cold impact aluminum extrusion method, as disclosed in my above-mentioned U.S. application Serial No. 785, and suitable machinery operations are then performed. A bottom plate 17 may be soldered or otherwise secured to the bottom of the housing. A fuel chamber 18 is thus defined by the inner wall surfaces of plate 17 and wall portions 11–15. A conventional fuel-charging valve assembly 20 is threaded into position in a threaded opening 21 in plate 17. A knurled end cap 22 may be rotated for removal from a bayonet socket in the assembly 20 so as to permit the insertion of the discharge nozzle of a fuel-filling tank, whereby the chamber 18 may be filled with butane or another suitable liquefied gas fuel under substantial pressure. The valve assembly 20 may be of the general construction disclosed and claimed in U.S. Patent No. 2,710,506, granted to C. Zellweger on June 14, 1955 and reissued on June 5, 1956 as Re. 24,163.

Top plate 15 has a circular opening 23 provided with a threaded lower portion 24 which receives a threaded body 26 of a gas burner valve assembly 25 so that the assembly may be mounted with a rotatable adjusting bushing 27 projecting up above opening 23. Projecting up through a central opening in the bushing 27 is the gas burner outlet end of a tube 28 in which is centrally located a valve rod 29 for selectively opening and closing the valve to permit gas to escape from outlet 28 when rod 29 is raised and to prevent further escape of gas, respectively, when rod 29 is depressed. One end of a fuel-feeder wick 30 dips down into the liquid fuel stored in chamber 18 while an intermediate portion passes through side openings in the lower body 31 of the valve assembly for supplying a continuous quantity of liquid fuel to the inlet of the valve.

A series of vertical grooves 32 are formed around the outer cylindrical surface of bushing 27 so as to receive and mesh with a corresponding series of vertical grooves 34 formed around the inner cylindrical surface of a rotatable gas flame height-adjusting wheel 33. Wheel 33 has a beveled upper surface 36 and has a series of vertical grooves formed around its outer vertical surface and has a radial knob 35. As shown in FIG. 2, the gas burner outlet 28 and the valve pin 29 both project above the top of wheel 33. Wheel 33 may be rotated by the user in either direction through a limited arc by manipulating knob 35.

This in turn causes rotation of bushing 27 which then serves to apply either greater or less pressure, depending on the direction of rotation, upon the intermediate portion of wick 30 which passes through body 31. The amount of pressure exerted upon wick 30 controls the flow of gaseous fuel into the valve and hence controls the height of the gas flame when the valve is open during normal use of the lighter. A gas burner valve and adjusting wheel assembly for gas lighters is disclosed in detail in the copending U.S. patent application Serial No. 32,437, filed May 27, 1960, by myself and S. Shernock.

Rising above the side walls 11 and 12, respectively, and above the levels of the front and rear walls 13 and 14 are two parallel standards or supports 38 and 39 which may be formed as ears which are integral with the side walls 11 and 12, respectively. The ears 38 and 39 have circular apertures 40 and 41 which are horizontally aligned and which receive the opposite ends of a horizontal axle or pivot means. As shown in FIG. 6, the axle or pivot means comprises a cylindrical rod or pin 42 which has its head seated in the recess of hole 40 and which has its other end terminating at the inner surface of ear 39, such end being threaded internally so as to receive a screw 43 which has its head seated in the recess of hole 41. The heads of pin 42 and rod 43 are provided with screwdriver slots, and they are tightened into position so that they are secure between ears 38 and 39 and so that they are not rotatable.

The top wall 15 and the bottom plate 17 have vertically aligned circular apertures 46 and 47, respectively. Aperture 46 is threaded to receive the threaded upper portion of a vertical flint tube 48, the lower end of which terminates at aperture 47. Inside of tube 48 is a removable flint holder assembly comprising a knurled end cap 49 which is seated in the recess of hole 47 and which has a shank portion 50 around which is fitted the lower end of an elongated compression bias spring 51, the upper end of spring 51 being fitted around the lower part of a cylindrical plunger element 52. The top of element 52 engages the bottom of a cylindrical pyrophoric element such as flint 53 so that the top of the flint 53 is continuously pressed against the serrated undersurface of a sparking wheel 54.

The operating mechanism will now be described for selectively releasing gas from the outlet 28, for igniting such gas and for subsequently quenching the gas flame and cutting off the flow of gas from outlet 28. A fingerpiece 56 is provided having a U-shaped body with two parallel legs 57 and 58. The ends of legs 57 and 58 have rack teeth 59 and 60 for meshing with respective pinion gears 66 and 67. Bridged across legs 57 and 58 is an integral operating portion 61. Secured to the underside of portion 61 is a cylindrical plunger 62 which is located loosely within the upper part of the hollow guidepost 16 for vertical movement therein. An elongated compression bias spring 63 has its lower end supported on the bottom wall 64 of the hollow chamber inside post 16.

As shown in FIGS. 4 and 6, the pinion gears 66 and 67 have central apertures and are loosely supported on fixed pin 42 near its opposite ends, respectively, so as to be rotated by the meshing rack teeth of the respective legs 57 and 58 when the fingerpiece 56 is depressed by the user. There is provided a hollow snuffer lever 68 having a forward cap portion 69. Each of the side walls of lever 68 has a teeth-shaped opening 70, only one of which is shown in FIG. 1, so as to receive the inner portions of the teeth of the pinion gears 66 and 67, respectively. In this manner lever 68 is supported by gears 66 and 67 and is adapted to be rotated by gears 66 and 67 about the axis of pin 42 and up and away from its closed position shown in FIGS. 2–7. A closure element (not shown) is carried inside the snuffer cap so as to normally engage the top end of the spring-biased valve stem 29 to maintain the valve in its closed condition as long as snuffer lever 68 is in its closed position.

As shown in FIG. 1, the sparking wheel 54 has a serrated abrasive layer 72 around its periphery and has a central opening 73 so that it may be loosely mounted on pin 42 inside the snuffer lever for rotation about the axis of pin 42. The side face of wheel 54 which faces gear 66 is provided with a circular array of ratchet teeth 74 adapted for engagement with the bent or offset tooth or lip 76 of a thin clutch plate 75 which is provided with an aperture 77 so that plate 75 may be loosely mounted on pin 42 inside the snuffer lever between wheel 54 and the side wall of the snuffer lever which receives gear 66.

Clutch plate 75 is confined within the rear side portion of snuffer lever 68 and has a straight upper edge 78 which is in engagement with a corresponding inner edge portion inside of the snuffer lever, as indicated generally by the dotted line 78' in FIG. 1.

It will thus be seen that when snuffer lever 68 is rotated up in a clockwise direction in response to rotation of gears 66 and 67 due to downward movement of fingerpiece 56, then in turn this forces clutch plate 75 to be carried along so as also to rotate clockwise about the axis of pin 42. Rotation of plate 75 in turn causes step-by-step rotation of the sparking wheel 54 against the engaging top portion of flint element 53 to produce a shower of sparks which are directed toward the outlet portion 28 so as to ignite the gas escaping therefrom. Upon release of finger pressure on fingerpiece 56, it is moved upward to its original position due to the force of spring 63, and this in turn causes snuffer lever 68 to rotate counterclockwise back to its normal closed position. Clutch plate 75 in turn is forced to rotate back in a clockwise direction, but it rotates with respect to sparking wheel 54 which now remains stationary, the clutch tooth 76 idling or sliding past the inclined ratchet teeth 74 in wheel 54.

The novel windshield arrangement will now be described in detail. In accordance with a feature of the invention, the support ears 38 and 39 each have a vertical recess or groove 80 and 81 formed in the inner surface of the respective ear ahead of apertures 40 and 41 for a purpose to be explained later. There is provided a windshield member 82 having a generally U-shaped configuration and having a pair of parallel legs 83 and 84 supported adjacent the inner surfaces of ears 38 and 39 respectively. The upper edge 85 of the front portion is bent partially over to present a smooth surface. The windshield is dimensioned so as not to interfere with the rotation of snuffer lever 68. As shown in FIGS. 2 and 5, in its normal shielding position the main forward portion of the windshield encompasses the gas outlet 28 and the top of the valve stem 29 to shield the flame, and its lower edge is spaced radially outward from the flame-adjusting wheel 33 and partially overlapping it so as to permit a controlled amount of ambient air to gain access to outlet 28 to support the combustion properly.

The forward ends of ears 38 and 39 have straight parallel sloping edges 87 and 88, respectively, while the intermediate offset or flange portions of the windshield have straight parallel surfaces 90 and 91 which have the same slope as edges 87 and 88 and which are in abutment against edges 87 and 88, respectively, when the windshield occupies its normal shielding position, which abutment serves to support the front end of the windshield but prevents rotation of the windshield while it is in such shielding position.

In accordance with a feature of the invention, the legs 83 and 84 are provided with horizontally aligned slots 92 and 93 which have a height only slightly greater than the diameter of the pivot pin 42 so that pin 42 may pass through such slots to support legs 83 and 84. As shown in FIG. 5, when the windshield is in its normal position, the legs 83 and 84 are preferably displaced so that the lefthand ends of slots 92 and 93 are spaced somewhat ahead of pin 42. Novel means are provided for releasably holding or locking the windshield in its normal position. Legs 83 and 84 are provided with parallel vertical detent portions which may be formed as vertical bulges or crimps 94 and 95, respectively, located preferably adjacent and behind the offset portions 90 and 91. In the normal windshield position, the vertical detent portions 94 and 95 are located within the vertical grooves 80 and 81 formed in ears 38 and 39, respectively, to prevent its forward movement.

The windshield may be composed of a material such as a steel alloy so that the thin legs have sufficient flexibility to permit them to be flexed slightly towards each other in response to finger pressure applied by the user when he grasps the windshield slightly forward of the offset portions 90 and 91. Accordingly, the detent portions become disengaged from the grooves, and the windshield is free now to be moved forward by the user to the new position shown in FIG. 7. The righthand ends of slots 92 and 93 serve as limit-stops for the windshield since further forward movement is prevented when the righthand ends of slots 92 and 93 make contact with the axle pin 42.

From the forward position shown in FIG. 7, the windshield now has its offset portions 90 and 91 spaced sufficiently from the forward edges 87 and 88 of the ears so that the windshield is now capable of being rotated about the axis of pin 42 and up and away from the gas burner 28. The dotted lines in FIG. 7 show the position of the windshield if it is rotated all the way up to its extreme position where the top part of the detent portions will make contact with the rear top portions of ears 38 and 39, respectively.

By virtue of the above-described construction, the windshield is capable of still another mode of operation. Instead of squeezing legs 83 and 84 towards each other and pulling the windshield forward to a position where it may be rotated up, the user may instead simply insert his thumbnail underneath the lower forward edge of the windshield and lift the wieldshield slightly. Rotation about the axis of pin 42 does not occur. The immediate result is that a component forward force is simultaneously developed which serves automatically to move the legs 83 and 84 forward a short distance as their slot portions slide along pin 42. The windshield has thus been moved automatically to a slightly tilted intermediate position from which it now is free to be swung up completely away from gas burner 28 by having the upper portions of the offset surfaces 90 and 91 ride up in a cam-like manner along the top ends 97 and 98, respectively, of the front ear edges 87 and 88. Although the detents 94 and 95 and the grooves 80 and 81 are preferably employed for releasably locking the windshield, they may be omitted, if desired, and they do not produce or contribute to the last-described mode of operation. Also, the detents and grooves may be located rearwardly of pin 42, if desired, but a more positive snap action is obtained if they are located as shown.

While the invention has been illustrated and described with respect to a particular embodiment, it will now be understood by those skilled in the art, after reading this application, that various changes and modifications may be made without departing from the spirit and scope of the invention as defined by the appended claims.

What is claimed is:

1. In a cigar lighter, a housing having a fuel storage compartment, an outlet portion for escape of fuel to be ignited which is disposed near an upper region of said housing, a windshield member, mounting means permitting both rotational and limited lateral movement of said windshield member relative to a fixed axis on said housing, and lock means associated with said mounting means for preventing rotational movement of said member when in a first position partially surrounding and shielding said region, said lock means being disengageable by lateral movement of said member from said first position to a second position thereof to permit rotatable movement of said member to a third position thereof which is up and away from said region.

2. A cigar lighter comprising a housing having a fuel storage compartment, an outlet portion for escape of fuel to be ignited which is located near an upper region of said housing, manually operated means for selectively controlling the escape and ignition of fuel from said outlet portion, a pair of supports extending upwardly on opposite sides of said housing, a windshield member having two opposed free ends each supported adjacent the inner surface of a respective one of said supports and having at least one intermediate portion which is spaced from said free ends and which normally is in engagement with a front portion of one of said supports to prevent rotation of said windshield member when said member is in a normal first position to shield said outlet portion, and means adapted to permit said windshield to be movable forward to a second position at which said intermediate portion is spaced from said front portion of said support and from which said member may be rotated upwardly away from said outlet portion.

3. A lighter according to claim 2 wherein said last recited means comprises pivot means supported transversely between said pair of supports and wherein said windshield member has a pair of substantially parallel leg portions which terminate in said free ends respectively, each of said leg portions having a slot which extends in the direction of the leg portion and which is substantially parallel to the slot in the other leg portion, said member having its leg portions supported on said pivot means with said pivot means passing through said slots normally adjacent the forward ends of the slots to guide said leg portions when said member is moved from said first position to said second position at which said pivot means becomes located adjacent the rear ends of said slots and at which said member may be rotated upwardly about the axis of said pivot means.

4. A lighter according to claim 3 wherein there is provided means for releasably securing said leg portions of said windshield member in releasable locked engagement with said supports to hold said member in said first position.

5. A lighter according to claim 4 wherein said windshield member is composed of a material which imparts flexibility to said pair of leg portions and which permits said leg portions to disengage from said supports when the fingers of the user flex said leg portions slightly towards each other, whereby said member is free to move to said second position.

6. A lighter according to claim 5 which is constructed to produce automatic forward movement of said windshield member to an intermediate position from which it may be swung upwardly completely away from said outlet portion and at which said member is located between said first and second positions, said last-mentioned forward movement occurring in response to a lifting force applied by the user beneath the front lower portion of said member, said supports having substantially parallel front edge portions which terminate at their upper extremity in a substantially abrupt manner, said member having substantially parallel intermediate edge portions which are offset from said leg portions respectively and which are normally substantially aligned with said front edge portions of said supports so that each of said intermediate edge portions abuts against said front edge portion of a respective one of said supports when said member is in said first position, the upper parts of said intermediate edge portions riding up and over said upper extremities of said front edge portions so as to rock thereabout to produce said last-mentioned forward movement in response to said lifting force.

7. A lighter according to claim 6 wherein each of said supports has an upwardly extending groove formed on its inner surface, each of said leg portions having an upwardly extending detent portion which projects inwardly so as to fit releasably into said groove of a respective one of said supports when said member is in said first position.

8. A lighter according to claim 7 wherein said grooves and said detent portions are substantially vertical and are located forward of said pivot means to provide positive snap action.

9. A cigar lighter comprising a housing having a fuel storage compartment, an outlet portion for escape of fuel to be ignited which is located near an upper region of said housing, manually operated means for selectively controlling the escape and ignition of fuel from said outlet portion, a pair of supports extending upwardly on opposite sides of said housing, pivot means supported horizontally between said supports, said manually operated means including a pair of pinion gears carried by said pivot means, a snuffer lever and a sparking wheel adapted to rotate upon rotation of said gears, and a finger piece mechanism having rack portions adapted to mesh with said gears to rotate said gears when the finger piece is depressed, a pyrophoric element, spring means for contacting said element with said wheel to produce sparks upon rotation of said wheel, a windshield member having two opposed free ends each supported on said pivot means adjacent the inner surface of a respective one of said supports and having at least one intermediate portion which is spaced from said free ends and which normally is in engagement with a front portion of one of said supports to prevent rotation of said windshield member when said member is in a normal first position to shield said outlet portion, and means adapted to permit said windshield member to be movable forward to a second position at which said intermediate portion is spaced from said front portion of said support and from which said member may be rotated upwardly away from said outlet portion.

10. A lighter according to claim 9 wherein said lighter is a liquified gas type lighter comprising a gas burner valve, and said outlet portion comprises the outlet portion of said gas burner valve.

11. A lighter according to claim 10 wherein a gas flame height-adjusting wheel encompasses said outlet portion and said windshield member, when in said first position, is spaced a predetermined distance from said adjusting wheel to permit the inflow of ambient air to said region adjoining said outlet portion.

References Cited in the file of this patent

FOREIGN PATENTS

| | | |
|---|---|---|
| 145,226 | Austria | Apr. 10, 1936 |
| 38,121 | France | Jan. 7, 1931 |
| 1,198,575 | France | June 15, 1959 |
| 1,090,891 | Germany | Oct. 13, 1960 |
| 291,695 | Great Britain | June 7, 1928 |